United States Patent [19]

West et al.

[11] Patent Number: 4,630,306
[45] Date of Patent: Dec. 16, 1986

[54] APPARATUS AND METHODS FOR CODING AND STORING RASTER SCAN IMAGES

[75] Inventors: Geoffrey A. W. West; Walter J. Hill, both of London, England

[73] Assignee: National Research Development Corp., London, England

[21] Appl. No.: 601,340

[22] Filed: Apr. 17, 1984

[30] Foreign Application Priority Data

Apr. 29, 1983 [GB] United Kingdom ................. 8311813

[51] Int. Cl.⁴ ............................................. G06K 9/48
[52] U.S. Cl. ...................................... 382/21; 382/22; 382/26; 382/56
[58] Field of Search ........................ 382/26, 56, 21, 22, 382/20, 8; 364/900 MS File, 200 MS File; 358/106, 107

[56]  References Cited

U.S. PATENT DOCUMENTS

| 3,737,881 | 6/1973 | Cordi et al. | 364/900 |
| 3,887,762 | 6/1975 | Uno et al. | 358/106 |
| 4,080,652 | 3/1978 | Cronshaw et al. | 364/200 |
| 4,107,648 | 8/1978 | Frank | 382/26 |
| 4,183,013 | 1/1980 | Agrawala et al. | 382/26 |
| 4,189,711 | 2/1980 | Frank | 382/26 |
| 4,379,308 | 4/1983 | Kosmowski et al. | 358/106 |
| 4,445,191 | 4/1984 | York | 364/900 |

Primary Examiner—Leo H. Boudreau
Assistant Examiner—Joseph Mancuso
Attorney, Agent, or Firm—Cushman, Darby & Cushman

[57]  ABSTRACT

In automatically checking circuit boards by raster scanning, it is useful to code and store conductor boundaries for later analysis. Coding time can be reduced by storing an identification of a chain of boundary segments in one of two arrays each time a boundary is detected in a scan line, the identification being stored at an address corresponding to the position of the segment detected. At the same time signals describing the segment are stored in another store at an address related to the identification. When in the next scan line a boundary segment is detected, an address corresponding to its position is used to address the said array and if an identification is found, the new segment is stored in the other store as part of the chain identified. In order to reduce the size of the other store signals describing segments are not stored in areas allocated to chains but in the next vacant location and a RAM stores links between segments.

4 Claims, 6 Drawing Figures

| | DIRECTION |
|---|---|
| 0 1 / 0 1 | 1 |
| 0 1 / 1 1 | 2 |
| 0 0 / 1 1 | 3 |
| 1 0 / 1 1 | 4 |
| 1 0 / 1 0 | 5 |
| 1 1 / 1 0 | 6 |
| 1 1 / 0 0 | 7 |
| 1 1 / 0 1 | 8 |

Fig. 3

APPARATUS AND METHODS FOR CODING AND STORING RASTER SCAN IMAGES

The present invention relates to apparatus and methods for use in coding and storing discontinuities in raster scan images, particularly when automatically checking conducting paths on circuit boards.

In storing and analysing images obtained by scanning, for example with a television camera, a technique which may be used is to detect the boundaries of shapes in the image and store chain codes representing the boundaries, the chain codes being used later for analysis. In chain coding each boundary is divided into segments, each segment is represented by a code specifying the direction of the segment, for example, and the segments representing a boundary form a chain. If the start and-/or finish of each chain is also stored, the position of the corresponding boundary in the image is specified. A known method of coding is known as Freeman chain coding and is described in "On the encoding of arbitrary geometric configurations", IRE Transactions, (1961) EC-10, pages 260 to 268. An example of chain coding and its use is to be found in British Patent Application No. 8219801 published under the number 2 102 122 A.

According to a first aspect of the present invention there is provided apparatus for use in coding and storing raster scan images, comprising detection means for detecting discontinuities as they occur in a raster scan line and for deriving both respective position signals representative of the positions in the line of the discontinuities and respective segment signals representing segments of the discontinuities in the line, a first store for storing chains of the segment signals in which the chains represent respective discontinuities in an image being scanned, a second store for storing for each line and for the duration of the next line, identifying signals identifying all chains having segments in that line, each identifying signals being held at a location corresponding to the position in that line of the discontinuity represented by the chain identified by that signal, means for reading the second store as each point in a line is scanned at the location relating to the corresponding point in the previous line, and storing segment signals representing each new segment either as the beginning of a new chain if no chain identifying signal is stored at the location read, or as a further segment signal in an existing chain if the identifying signal of the existing chain is found at the location read.

An advantage of the invention is that on detecting a discontinuity in a scan line, an immediate determination can be made as to whether that discontinuity should be joined to a chain representing a previously found discontinuity, and if so, to which chain, or whether a new chain should be initiated. Previous schemes have required examining all previous chains each time a discontinuity is found and this is a comparatively lengthy process when a large number if discontinuities occurs per scan line as, for example, in scanning a circuit board.

The first store may comprise a segment-storing portion for the said segment signals, means for allocating locations in the segment-storing portion on the basis of availability (not chain identification) as segment signals are derived, and a link-storing portion for storing links allowing the location of one segment signal to be determined from the location of an adjacent segment signal in the same chain.

A first store configured in this way has the advantage of avoiding the need to allocate storage to an indeterminate number of chains of indeterminate length.

The detection means may include means for allocating segment signals on the basis of the direction of a discontinuity, and where the discontinuities are the boundaries of shapes, the segment signals may be at least partly determined on the basis that the boundary of the shape is given a direction which is clockwise (or alternatively anticlockwise) about points within the shape, and each segment has the same direction as the boundary portion it represents. In this way each segment has a start and a finish in the said direction. The second store may then comprise first and second arrays of storage locations, one location in each said array for each pixel in a scan line, the first and second arrays being used to store the identifying signals of chains having a segment starting and finishing, respectively, at locations corresponding to the scan line positions of the starting and finishing segments.

According to a second aspect of the present invention there is provided a method for use in coding and storing raster scan images, comprising the steps of detecting discontinuities which occur in a scan line during raster scanning and deriving both respective position signals representative of the positions in the scan line of the discontinuities and respective segment signals representing segments of the discontinuities at the scan line, storing chains of the segment signals in which each chain represents one discontinuity, storing, for each line and for the duration of the next line, identifying signals identifying all chains having segments in that line, each identifying signal being held by a store at a storage location corresponding to the position in the line of the discontinuity represented by the chain identified by that signal, reading, as each point in a line is scanned, the location of the store relating to the corresponding point in the previous line, and storing segment signals representing each new segment either as the beginning of a new chain if no chain identifying signal is stored at the location read, or as a further segment signal in an existing chain if the identifying signal of the existing chain is found at the location read.

Certain embodiments of the invention will now be described by way of example, with reference to the accompanying drawings, in which:

FIG. 3 illustrates directions and codes used for chain coding,

Figure 1:
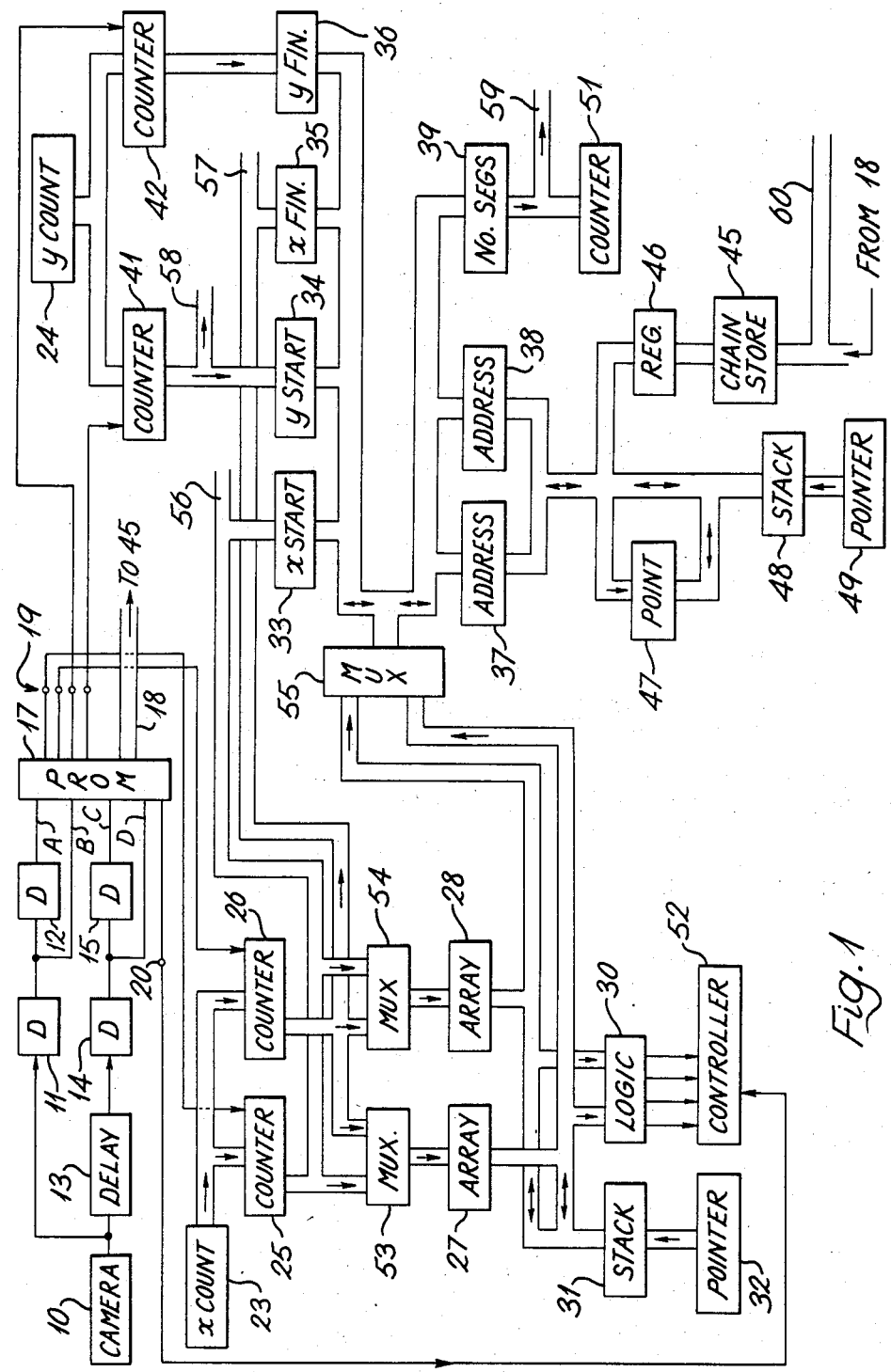
FIG. 1 is a block diagram of apparatus according to the invention.
Figure 2:
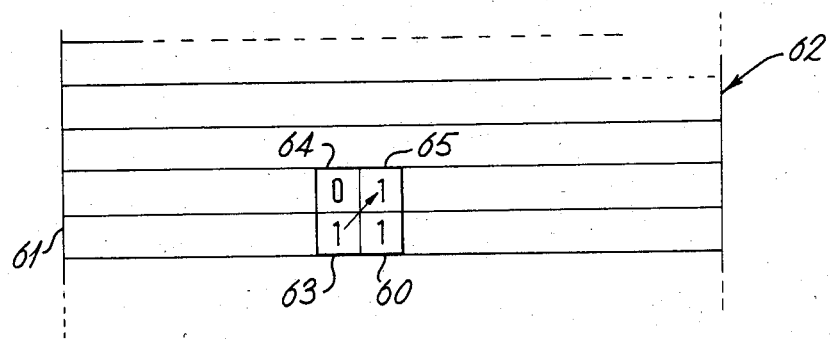
FIG. 2 illustrates how directions of segments of edges are recognised.

In FIG. 1 a television camera 10 provides a digital output representing an object such as a circuit board having conducting paths which are to be coded before being checked for errors. Each pixel in the digital output is represented by a 1 or 0 depending on whether it is judged to be white or black; for example for a dark green circuit board, copper is usually represented by 1 while the board background is represented by 0. The output from the camera is firstly applied to a D-type bistable circuit 11 and then to a similar circuit 12. The camera output also passes by way of a one line delay circuit 13 with output coupled to a D-type monostable circuit 14 which itself is coupled to a similar circuit 15. Clock pulses applied to the circuits 11 to 15 ensure that binary signals representing respective pixels move at pixel repetition frequency through the circuit. The D-type bistable circuits 11, 12, 14 and 15 provide the information required to detect a discontinuity such as the edge or boundary of a conducting path and that required for the previously mentioned direction coding which is carried out as follows. At each pixel in a scan line, the binary values of that pixel, the preceding pixel and the two corresponding pixels of the previous line are used for edge detection and to determine a direction code in the form of a vector. For example in FIG. 2 when a pixel 60 of a partially completed raster 62 is reached, the values of the pixel 60 and pixels 63 to 65 are considered. FIG. 3 shows how eight possible directions can be determined from four pixels. Eight groups of pixels are shown in the first column and the corresponding directions in the second column. For example direction 2 is that shown in FIG. 2 where the pixels 60, 63 and 65 have the value 1 and the pixel 64 has the value 0. This example relates to detecting an edge of a black shape which is encountered in scanning from left to right. Since directions are coded clockwise with reference to points within a shape, the vector is considered to start in the pixel 63 and finish in the pixel 65. Thus the vectors shown end in the pixels containing arrowheads.

The outputs of the D-type circuits 11, 12, 14 and 15 are passed to a PROM 17 which generates signals representing the appropriate vectors at a channel 18 by means of the following stored table.

| Input terminals | | | | Channel 18 (direction) | Terminals 19 (offset) | | | | Terminal 20 (edge present) |
|---|---|---|---|---|---|---|---|---|---|
| A | B | C | D | | $x_s$ | $y_s$ | $x_f$ | $y_f$ | |
| 0 | 1 | 0 | 1 | 0 0 1 | 1 | 1 | 1 | 0 | 1 |
| 0 | 1 | 1 | 1 | 0 1 0 | 0 | 1 | 1 | 0 | 1 |
| 0 | 0 | 1 | 1 | 0 1 1 | 0 | 1 | 1 | 1 | 1 |
| 1 | 0 | 1 | 1 | 1 0 0 | 0 | 0 | 1 | 1 | 1 |
| 1 | 0 | 1 | 0 | 1 0 1 | 0 | 0 | 0 | 1 | 1 |
| 1 | 1 | 1 | 0 | 1 1 0 | 1 | 0 | 0 | 1 | 1 |
| 1 | 1 | 0 | 0 | 1 1 1 | 1 | 0 | 0 | 0 | 1 |
| 1 | 1 | 0 | 1 | 0 0 0 | 1 | 1 | 0 | 0 | 1 |

Since a vector does not necessarily start or end at the pixel currently being scanned, the PROM 17 also generates offset signals at terminals 19 allowing the co-ordinates of the start or finish of a vector to be determined from the co-ordinates of the currently scanned pixel. In the table the subscripts s and f denote start and finish, respectively. The way in which these vectors are stored as segments of chains is described later. In addition the PROM 17 provides an output at the terminal 20 when the contents of the D-type circuits 11, 12, 14 and 15 indicate that an edge has been detected. Input terminal combinations which do not represent the detection of an edge and the corresponding outputs in other columns are omitted from the table because the outputs are not significant except for that at a terminal 20 which when an edge is not detected is always a "0".

The x co-ordinate of an edge segment currently detected is now found, as follows. The x and y co-ordinates of the pixel currently being scanned are held by counters 23 and 24, the contents of the counter 23 being transferred to counters 25 and 26 each time an edge is detected as signalled from the terminal 20 of the PROM 17. At the same time any x co-ordinate offset which appears on one of the terminals 19 is applied to the counter 25 to allow the counter to determine the x co-ordinate of the finish of a segment which is to be joined at the start end of a chain of stored segments representing a boundary. The counter 26 also receives an x co-ordinate offset from another of the terminals 19, when appropriate, relating to a segment which is to be joined at the finish end of a chain and determines the x co-ordinate of the start of such a segment.

Since edge detection may occur at a higher rate than vectors can be derived and stored as chain segments, a buffer circuit (not shown) may be used to hold the outputs of the D-type circuits, the x co-ordinate of the corresponding points scanned, and some indication of the line being scanned (such as its y co-ordinate or a bindary number to distinguish between two successive lines) until the offset signals can be generated by the PROM 17.

Two storage arrays 27 and 28 are used to allow a currently detected segment to be joined to a chain representing a previously found edge, or to initiate the storage of a chain representing a newly found edge. The arrays 27 and 28 each have a number of locations equal to the number of pixels in one scan line and are used to store numbers allocated to any chains which were detected in the previous line scanned. The array 27 stores the chain numbers of chains which start in the scan line immediately preceding the current line and similarly the array 28 stores the chain numbers of chains which finish in the previously scanned line. The words "start" and "finish" apply to chains since the start of a new segment is joined to the finish of the previous segment, or vice versa, so giving the whole chain a start or finish. In both the arrays 27 and 28, the chain numbers are held in locations which correspond to the x co-ordinate of the pixel in which they started or finished.

If now the contents of the counter 26 representing the position of the finish of a currently detected edge (potentially for joining at the start of a chain) are used to address the array 27, then the new segment has to be joined to any chain whose number is held at the location addressed. Similarly if the contents of the counter 25 representing the position of the start of a currently detected edge (potentially for joining at the finish of a chain) are used to address the array 28, then the new segment has to be joined to any chain whose number is held at the location addressed.

Figure 4:
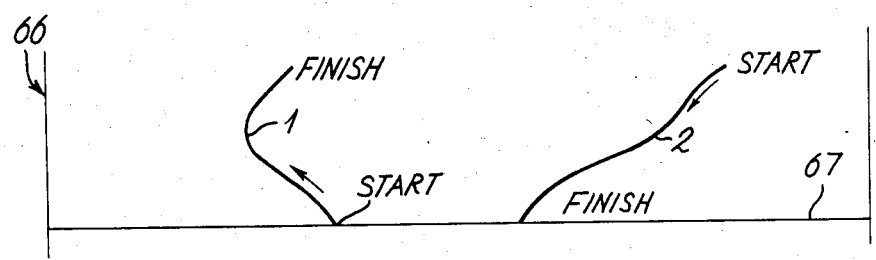
FIG. 4 illustrates how arrays 27 and 28 of FIG. 1 are used.

For example in FIG. 4 part of a scan 66 is shown in which two edges have been detected. The numbers 1 and 2 have been allocated to chains of vectors representing these edges by the apparatus of FIG. 1 as will be described and the numbers are shown in FIG. 4. All locations of the arrays 27 and 28 are shown below the partial scan together with their contents and it can be seen that the array 27 holds a 1 at the position which corresponds to the present start of the chain 1 in the last line scanned, all other locations containing zero. The array 28 holds a 2 at the position which corresponds to the present finish of the chain 2. Thus when scanning along the current line 67 if an edge is detected and the position of this edge is used to address the appropriate one of the registers 27 and 28, the number of a chain to which a new segment (represented by a vector) is to be added is found.

When direction numbers 1 and 8 are detected no chain can be linked to the start of the detected segment since linking can only occur later in the scan. Similarly for directions 3 and 4 no chain can be linked to the finish of the detected segment. Therefore when the directions 1 and 8 occur the array 28 is not addressed and when the directions 3 and 4 occur the array 27 is not addressed.

Other actions than adding to existing chains may also be required, as will become apparent, and when an edge is detected a logic circuit 30 examines the contents of the arrays 27 and 28 to determine the next action. The logic circuit 30 carries out the following five condition tests, where S and F are the contents of the arrays 27 and 28 at the location addressed, and NCH is a number allocated to a chain:

Condition (1)
If F and S = 0    No linking, generate new chain code.
Condition (2)
If    F = NCH
and   S = 0
then edge segment links to finish of chain NCH.
Condition (3)
If    F = 0
and   S = NCH
then edge segment links to beginning of chain NCH.
Condition (4)
If    F = S = NCH    Edge segment links ends of chain NCH together.
Condition (5)
If    F = NCH1    Edge segment links chains NCH1 and
and   S = NCH2    NCH2 together.

Figure 5:
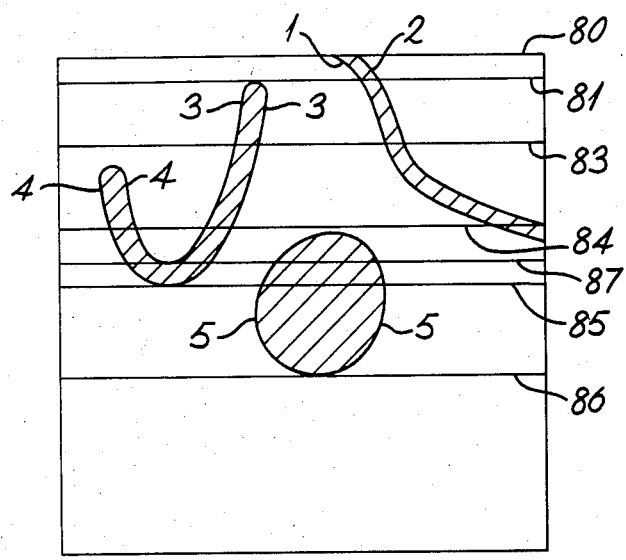
FIG. 5 shows an example of various edges which occur in a scanned image.

The conditions 1 to 5 are illustrated in FIG. 5 which shows an image made up of a number of shapes. When the first line 80 is scanned and when a subsequent line 81 is scanned, the condition 1 is satisfied and chains 1, 2 and 3 (which are not the same chains as in FIG. 4) are initiated. In a typical scan line 83, the condition 2 is satisfied by the chains 2 and 3, and the condition 3 is satisfied by the chains 1 and 3. In a scan line 84, the chain 2 goes off the image and is removed from storage as is described below for further processing. The condition 5 is satisfied in a line 87 where the chain 3 joins a chain 4, and then in a line 85 the condition 4 is satisfied, and the two ends of the resultant chain are linked forming a closed loop. This chain can now be removed from storage. Similarly in a line 86 the two ends of a chain 5 meet satisfying the condition 4 and allowing the chain to be removed from storage.

If condition 1 is satisfied it is necessary to allocate a new chain number and store the first segment as will now be described. Available chain numbers are held on a stack in a RAM 31 and a counter 32 points to the next available number on the stack.

The new chain number is used to address one location in each of seven RAMs 33 to 39, the RAMs 33 to 36 being provided to hold the x and y co-ordinates of the start of a chain and its finish while this information is used. If the start (rather than the finish) of a chain has been detected, as is indicated by the direction of the first segment and thus by the output of the PROM 17, the contents of the counter 25 are read into the RAM 33 to give the x co-ordinate of the start. The y co-ordinate is determined by a counter 41 which receives the y count from the counter 24 and the y offset for the segment of the new chain from one of the terminals 19 of the PROM 17. The contents of the counter 41 are transferred to the RAM 34. If on the other hand it is the finish of a new chain which is detected, the x co-ordinate of the finish is read into the RAM 35 from the counter 26 and the y co-ordinate is read into the RAM 36 from a counter 42 connected to the counter 24 and also to receive the y offset from another of the terminals 19.

The chain segments, that is the direction vectors in the form of three digit binary numbers, are held in a RAM 45 which is addressed by a register 46. Segments are not held in an order which depends upon having all the segments of one chain together but rather on the basis that as a segment is detected it is stored in the RAM 45 and identified as belonging to a particular chain by means of the RAMs 37 and 38 used to hold the addresses of the first and last segments of the chain, respectively and a RAM 47 which holds a pointer linking the various segments of a chain.

When a new chain is started a stack held in a RAM 48 is addressed by means of a point held in a counter 49 to obtain the next available location in the RAM 45. Using the address of this location the vector for the first segment of the new chain is read into the RAM 45 using the address from the stack now held in the register 46. At the same time the stack address from the RAM 48 is read into the two RAMs 37 and 38 at the address corresponding to the chain number read from the stack in the RAM 31. Since a new chain is being entered the addresses of the first and last chain segments are initially the same.

A further operation which the logic circuit 30 now initiates is the loading of the array 27 or 28 with the number allocated to the new chain at the address held by the counter 25 or 26.

When an edge detected coincides with the start or end of an existing chain, that is the above mentioned condition 2 or 3 is satisfied, the number of this chain is available from one of the arrays 27 and 28 and is used to address the RAMs 33 to 36 for storage. In this way the x and y co-ordinates of the start or finish of the chain are updated from the counters 25 and 41 or 26 and 42. The number of segments in each chain is stored by the RAM 39 and for an existing chain is incremented using a counter 51, the chain number being used to read the number of segments into the counter 51 where the number is incremented before being read back into the RAM 39.

For condition 2, the stack pointer in the counter 49 is used to indicate the address of the next available location in the RAM 45 by pointing to the address of the next available location in the stack held by the RAM 48. Thus the new vector is stored in the RAM 45 but in addition the contents of the RAM 38 giving the location in the RAM 45 of the last segment is read into the RAM 47 before the pointer is updated from the stack 48 with the address in the RAM 45 of the new segment.

To clarify the operation of the circuits 38, 45 and 47 to 49 an example is now described with reference to FIG. 6. When a new segment is to be stored the stack pointer in the counter 49 is used to address the RAM 48, as indicated by a line 70, to give the address of the next available location in the RAM 45 for storing the vector representing the new segment. The RAM 45 is now addressed and the vector entered as indicated by lines 71 and 72. At the same time the number of the chain to which the segment is to be linked is used to address the RAM 38 (see a line 73). Thus from this RAM the address in the RAM 45 of the previous segment in the chain is used to address the RAM 47 (line 74) and the address in the RAM 45 of the new segment is entered from the RAM 48 into the RAM 47 (line 75), providing a link pointer between segments of the chain. Finally the address of the new segment is entered into the RAM 38 at the address corresponding to the chain number as indicated by the line 76.

When condition 3 occurs, the procedure is similar to that for condition 2 except that the RAM 37 is used instead of the RAM 38.

Figure 6:
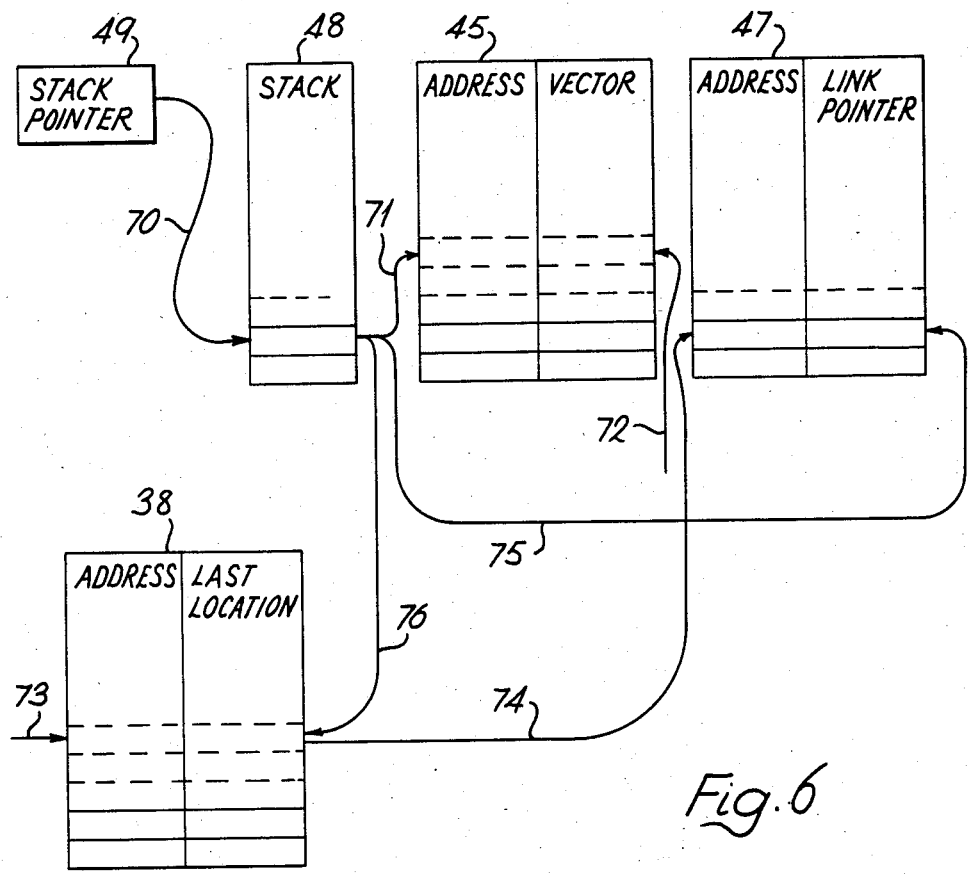
FIG. 6 is a diagram showing how various stores of FIG. 1 are used.

The arrangement of FIG. 6 is used because it allows the RAM 45 to be of a minimum size since locations are taken up only as they are needed instead of having to allocate areas of storage for an indefinite number of chains of indefinite length. The arrangement allows chains to be read out and erased easily as will be described, and new chains to be substituted.

When the above mentioned conditions 2 or 3 are satisfied, the logic circuit 30 again enters the current chain number indicated by the RAM 31 into the array 27 or 38 at the address held by the counter 25 or 26 but it is often necessary to replace a chain number in an adjacent location by a zero as is mentioned further below.

When the conditions 4 or 5 occur, or a chain goes off the side of the image, or more than 100 segments of chain have been stored, the decision logic 30 causes the chain to be removed from storage and passed by way of channels 56 to 60 to, for example, a computer for further processing. Using the chain number, the RAM 37, giving the address in the RAM 45 of the first segment of the chain, is addressed, and the contents held in the RAM 45 at the address given are read. The contents of the corresponding location in the RAM 47 is moved to a register 46. The address in the RAM 45 where the contents have been read is added to the top of the stack 48 and the stack pointer in the counter 49 is decremented by one. The address held by the register 46 is used to find the second segment of the chain in the RAM 45 and the above procedure is repeated until the whole chain has been read. In order to signal the end of reading, the chain number is used to read the number of segments in the chain from the RAM 39 into the counter 51, this counter being decremented each time a segment is read. When the counter reaches zero, reading is stopped. Read-out through the channels 59 and 60 takes place as the segments are read but analysis of the chains is not part of this invention and is not described.

If a chain is erased because the number of segments stored has reached a predetermined number, for example 100, (as is determined each time a segment is detected by read-out for the appropriate chain from the RAM 39), then the first and/or last 15 segments may be retained for overlap purposes so that a new chain continuing the previous chain but starting or finishing with the 15 stored segments is held. This new chain has the same number as the chain which has been erased. In order to determine whether an overlap for either or both ends of the chain is required, the arrays 27 and 28 are addressed by way of the multiplexers 53 and 54 at the start and finish addresses of the chain as given by the RAMs 33 and 35. If the number of the chain is found at one or both of the locations addressed then the appropriate end or ends of the chain are retained.

When the conditions 4 and 5 occur, zeros are entered into the arrays 27 and 28 at the addresses held by the counters 25 and 26.

A controller 52 controls the timing of the transfer of information between the various circuits of FIG. 1, read-out by way of channels 56 to 60, and multiplexers 53 to 55 which are used for data transfer. These processes while involved do not relate to the present invention and are a matter of complex design rather than invention and for these reasons and in the interests of brevity they are not described in this specification.

While a specific embodiment of the invention has been described it will be clear that it can be put into practice in many other ways. In particular the overall interconnection pattern of FIG. 1 can be changed and a variety of different circuits may be used. The invention can also be put into practice using a programmed computer.

We claim:

1. Apparatus for use in coding and storing raster scan images, comprising means for scanning images in a series of raster scan lines, detecting means for detecting discontinuities as they occur in a raster scan line and for deriving both respective position signals representative of the positions in the line of the discontinuities and respective segment signals representing directions of segments of boundaries formed by discontinuities in the line, each segment direction including a positive or negative polarity determined by the direction of a boundary of which that segment forms part, the positive direction being a predetermined direction of traverse around a shape which is enclosed by the boundary, a first store coupled to the detection means for storing chains of the segment signals in which the chains represent respective discontinuities in an image being scanned, the contents of the first store forming, when a scan is complete, part of a coded and stored version of an image scanned, logic means for determining when a new discontinuity not connected to previously-detected discontinuities is detected, means coupled to the logic means for allocating identifying signals for the said chains when a said new discontinuity is detected, and a second store with address input coupled to the said detection means and a content input coupled to the said means for allocating identifying signals, the second store having first and second arrays of storage locations, one location in each said array for each pixel in a scan line, the first and second arrays being used, in operation, to store for each line and for an interval of one line period, the identifying signals of chains having a segment starting and finishing, respectively, as determined by the positive direction, at locations corresponding to the line positions of the starting and finishing segments, the logic means being coupled to read the second store as each point in said raster scan line is scanned at the location relating to the corresponding point in the previous said raster scan line, and the logic means causing the first store to store segment signals representing each new segment either as an end of a new chain if no chain identifying signal is stored at the location read, or as a further segment signal in an existing chain if the identifying signal of the existing chain is found at the location read.

2. Apparatus according to claim 1 wherein the first store comprises a segment-storing portion for the said segment signals, means for allocating locations in the segment-storing portion on the basis of availability as segment signals are derived, and a link-storing portion for storing links allowing the location of one segment signal to be determined from the location of an adjacent segment signal in the same chain.

3. Apparatus according to claim 1 wherein the detection means includes means for allocating segment signals according to the direction of a discontinuity.

4. Apparatus according to claim 1 comprising a programmed computer forming at least part of at least one of the said means and stores.

* * * * *